United States Patent
Morton et al.

(10) Patent No.: US 9,074,037 B2
(45) Date of Patent: Jul. 7, 2015

(54) IRON-CONTAINING POLYMER SUITABLE FOR REGENERATING DIESEL EXHAUST PARTICULATE TRAPS

(75) Inventors: Colin Morton, Standford in the Vale (GB); Russell M. Thompson, Whitney (GB)

(73) Assignee: Infineum International Limited, Abingdon, Oxfordshire (GB)

( * ) Notice: Subject to any disclaimer, the term of this patent is extended or adjusted under 35 U.S.C. 154(b) by 1472 days.

(21) Appl. No.: 12/593,062

(22) PCT Filed: Mar. 7, 2008

(86) PCT No.: PCT/EP2008/001835
§ 371 (c)(1),
(2), (4) Date: Sep. 25, 2009

(87) PCT Pub. No.: WO2008/116553
PCT Pub. Date: Oct. 2, 2008

(65) Prior Publication Data
US 2010/0043411 A1 Feb. 25, 2010

(30) Foreign Application Priority Data
Mar. 28, 2007 (GB) .................................. 0705919.9

(51) Int. Cl.
| | |
|---|---|
| *F02B 43/00* | (2006.01) |
| *C08F 292/00* | (2006.01) |
| *C08F 255/00* | (2006.01) |
| *C08L 51/04* | (2006.01) |
| *C08L 51/06* | (2006.01) |
| *C08L 51/10* | (2006.01) |
| *C10L 1/14* | (2006.01) |
| *C10L 1/30* | (2006.01) |
| *C10L 10/02* | (2006.01) |
| *C10L 10/06* | (2006.01) |
| *C10L 1/19* | (2006.01) |
| *C10L 1/198* | (2006.01) |

(52) U.S. Cl.
CPC ............. *C08F 292/00* (2013.01); *C08F 255/00* (2013.01); *C08L 51/04* (2013.01); *C08L 51/06* (2013.01); *C08L 51/10* (2013.01); *C10L 1/14* (2013.01); *C10L 1/191* (2013.01); *C10L 1/1985* (2013.01); *C10L 1/301* (2013.01); *C10L 10/02* (2013.01); *C10L 10/06* (2013.01)

(58) Field of Classification Search
USPC ......... 60/274, 295, 311; 525/418, 327.2, 196; 44/363, 365, 307, 354, 358; 528/272, 528/395, 271; 524/785
See application file for complete search history.

(56) References Cited

U.S. PATENT DOCUMENTS

| | | | |
|---|---|---|---|
| 6,488,725 B1 | 12/2002 | Vincent et al. | |
| 6,581,375 B2 * | 6/2003 | Kimber et al. | .................. 60/309 |
| 2003/0182848 A1 * | 10/2003 | Collier et al. | .................... 44/358 |
| 2004/0068921 A1 * | 4/2004 | Caprotti et al. | .................. 44/363 |
| 2005/0011187 A1 * | 1/2005 | Cook et al. | ...................... 60/311 |
| 2005/0060929 A1 * | 3/2005 | Caprotti et al. | .................. 44/354 |
| 2006/0000140 A1 * | 1/2006 | Caprotti et al. | .................. 44/354 |

FOREIGN PATENT DOCUMENTS

| | | |
|---|---|---|
| EP | 1344809 A | 9/2003 |
| EP | 1344811 A | 9/2003 |
| EP | 1512736 A | 3/2005 |
| EP | 1512736 A1 * | 3/2005 |

* cited by examiner

*Primary Examiner* — Hung Q Nguyen
*Assistant Examiner* — Ruben Picon-Feliciano
(74) *Attorney, Agent, or Firm* — Kenyon & Kenyon LLP

(57) ABSTRACT

An iron-containing polymer is provided for use as a fuel additive for promoting trap regeneration. The polymer shows a beneficial balance of physical properties, and is prepared from iron salts by a polymerization process involving base addition, and subsequent co-ordination of branched-chain polycarboxylate ligands. The polymer can be stored in highly concentrate form, and shows particular suitability for on board dosing systems.

34 Claims, No Drawings

IRON-CONTAINING POLYMER SUITABLE FOR REGENERATING DIESEL EXHAUST PARTICULATE TRAPS

The present invention concerns iron-containing additives for fuels, especially diesel fuel, and a process for preparing same. The additives promote the combustion of carbonaceous material, in particular in the regeneration of diesel exhaust particulate traps, and show excellent suitability for use in fuels and especially in diesel engine on-board dosing devices.

Carbonaceous fuels, whether of mineral (e.g. petroleum) or biological (e.g. animal and/or plant) origin, are a ubiquitous source of energy. In particular, much of the world is reliant on liquid carbonaceous fuels for powering vehicles, and for domestic and industrial power generation and heating. Efficient release of the energy contained within such fuels is dependent upon their effective combustion. Even in combustion devices of modern design, the chemical process of combustion typically does not run to completion, with the effect that a proportion of carbonaceous material is emitted not as carbon dioxide, but as one or more less oxidised species. In particular, particulate emissions comprising solid, carbon-rich matter are a well known by-product of incomplete combustion. The release of even small quantities of such emissions is under increasing environmental scrutiny.

A number of metals have been used, or proposed for use, as fuel additives to improve the combustion of carbonaceous material originating from the fuel. One such metal is iron. Combustion improvement in this way allows reductions in emissions, particularly particulate or smoke emissions, but may also be used to allow device operation at lower excess air levels, so reducing heat losses through the escaped gases and improving the efficiency of the system.

The diesel engine has proved a popular choice for powering many devices, including inter alia forms of transport such as road vehicles, trains and marine craft. The ever-increasing emphasis on engine efficiency has imposed increasingly stringent emissions standards on diesel-powered transportation devices, especially road vehicles. Today, the engineer must typically deploy a range of emissions control strategies to meet modern legislative and social emissions targets.

One established strategy for the control of particulate emissions from diesel engines is the use of a particulate trap (also known as a particulate filter) within the exhaust system of the engine. The trap typically comprises a filter element, with pore size selected to generally permit through-flow of exhaust gases but retain the small particles of incompletely-burned material that constitute the 'particulate' element of diesel emissions. In this way, the natural efficiency of the modern diesel engine is augmented by an exhaust filtration process which traps a substantial proportion of the small quantity of particulate still produced by the engine. The gases leaving the exhaust system (the 'tailpipe emissions') are thus substantially free of particulate, enabling the engineer to reach very low particulate emissions targets.

The action of the particulate trap in filtering out particulate material in time leads to clogging of the filter element. If left unattended, the gaseous flow through the filter becomes hindered to such an extent that significant back-pressure builds up in the exhaust system, affecting the operation of the engine. In addition, the effective filtration of further particulate is inhibited. For these reasons, the filter element must in turn be cleaned of collected particulate to preserve efficient function. This cleaning process is typically known in the art as 'regeneration'.

Regeneration of the filter is itself effectively achieved through a combustion process. Several alternative approaches have been developed.

So-called 'active' systems rely on the periodic application of external energy (such as heat) to raise the temperature of the collected particulate to the point where its spontaneous ignition will occur in the trap. Diesel engines run on a lean air:fuel stoichiometry, and the exhaust gas contains significant quantities of oxygen (left over from the air intake charge) which is available to combust the ignited particulate in situ. In such systems, the trap is therefore periodically a second combustion chamber, wherein the particulate is further combusted to gaseous products before leaving the tailpipe.

In contrast, 'passive' systems do not rely on external energy, but instead promote the in situ combustion of the collected particulate in other ways. Of these systems, the use of catalytic fuel additives has become accepted as a practical way to promote regeneration of particulate traps. Additives based on metals having the catalytic property of promoting ignition of the particulate at lower gas temperatures have been used commercially for this purpose. Spontaneous ignition of the particulate normally only occurs at temperatures of around 600 degrees Centigrade. Such temperatures are typically only reached (unassisted) by the exhaust gases during prolonged high speed, high load operation of the engine. The presence of a catalytic additive lowers that spontaneous ignition temperature significantly, promoting ignition over a wider range of typical exhaust gas temperatures. In consequence, regeneration is effected under a wider engine operating envelope, without the need for external energy sources. Depending on the degree of ignition promotion, the ignition and burn-off of trapped particulate may occur in a cyclic ('stochastic') fashion or continuously.

A number of metals have been used, or proposed for use, in trap regeneration additives. Of these metals, iron has proved particularly suitable. On the one hand, iron promotes regeneration sufficiently to allow long-term trap operation. On the other hand, iron is environmentally benign. During combustion, the iron in iron-containing compounds is converted to iron oxides, which become entrained in the particulate matter formed by incomplete combustion in the combustion chamber. When this particulate is thereafter trapped on the filter element, the iron is ideally positioned in situ amongst the carbonaceous material to be ignited, so enabling the ignition-promoting effect. The resulting tailpipe emissions ultimately release iron oxide, a naturally occurring substance, into the atmosphere.

However, the practical use of iron-containing additives has become associated with problems, which have limited the use of iron as a fuel additive.

Firstly, the introduction of iron compounds into diesel fuel has been associated with the formation of deposits on the engine fuel injectors. Diesel engine injectors have long been known to be susceptible to carbonaceous deposits, believed to be formed from the oxidation products of natural components of the diesel fuel, However, the use of an iron-containing additive has been observed to give additional deposit problems. The mechanism of this deposit formation is not fully understood, but involves the formation of deposits on the carefully-engineered surfaces of the injector parts. As a result, the spray pattern of the fuel upon injection is altered unfavourably, resulting in less complete combustion, and ultimately poorer emissions performance and loss of engine power. In addition, more advanced engines typically require more finely-engineered injectors built to finer tolerances, and must also meet more stringent emissions standards.

To take better advantage of iron's beneficial combustion-improver and trap regeneration properties, an iron-containing additive is required which shows a lower tendency towards fuel injector fouling.

Secondly, the iron-containing additive must be sufficiently soluble or dispersible within the fuel to actually reach the combustion chamber. Fuel distribution networks are typically complex and involve storage at intermediate depots and fuel service stations. Fuel may remain for days or even weeks in such environments. Similarly, on board the vehicle or other transportation device, the additive must remain evenly distributed in the fuel within the fuel tank. Additive which is lost from the bulk fuel through precipitation or sedimentation will be unable to effect regeneration, and can also cause filter blockage in the fuel system.

The tendency of an additive to remain well distributed within the fuel over time is hereinafter referred to as its "stability". To take better advantage of iron's beneficial properties as an additive, an iron-containing additive is required which shows greater stability in fuel, particularly under typical storage conditions in the distribution network and the fuel tank.

In particular, an iron-containing additive is required which shows greater stability in the presence of other fuel components known to cause regeneration additives to precipitate or sediment out of the fuel. Certain lubricity additives deployed in modern diesel fuel are known to prompt known regeneration additives (based on various metals, including iron) to precipitate or sediment out of the fuel.

Whilst trap regeneration additives are occasionally added to the bulk fuel in the distribution network, increasingly they find application in 'on board' additive dosing systems. These systems comprise devices that supply additive from a separate tank to the fuel system on board the vehicle (or other device), avoiding the need for the additive to be added to the fuel further upstream. In this way, a particular engine and trap combination can be optimised for use with a single, defined additive. Thus, for example, some diesel engine vehicles in current production are equipped with on board dosing devices, whereby additive held in concentrate form in a discrete storage tank on board the vehicle is dosed, via suitable means, into the fuel on board the vehicle. Vehicle management systems control the level of dosage and monitor system operation. The additive tank contains sufficient additive to permit long-term operation, and can be replenished as necessary.

Such on board dosing systems likewise require additive which is stable in the bulk fuel.

In addition, however, on board storage requires the additive concentrate to possess a viscosity low enough to be compatible with the on board dosing device, and to hold a concentration of additive sufficient to permit long-term operation on a relatively small volume of concentrate. Space on board the modern vehicle (or other transportation device) is at a premium, and the on board additive tank and dosing device must both be small. In addition, complexity adds cost and must be kept to a minimum. Higher pressure devices (necessary for effective dosing of more viscous liquids) must be avoided.

These desired physical properties create conflicting demands on the additive concentrate, and have proved difficult to satisfy in practice. To obtain greater stability, the iron has typically been stabilised by associating it with long-chain organic species. In doing so, the molecular weight of the overall molecule or complex is increased, leading to higher concentrate viscosities and proportionally lower iron contents. Reducing this viscosity to manageable levels also requires greater dilution, leading to lower iron concentration levels which require larger additive tanks.

To take advantage of iron's beneficial trap regeneration properties, an iron-containing additive is required which not only shows greater stability but also exhibits lower viscosity in highly concentrate form, better satisfying the physical limitations of on board dosing systems.

In addressing the above problems of injector fouling and conflicting physical properties, it is also essential that the resulting iron-containing additive remains effective in its primary function as a combustion improver or trap regeneration additive.

The present invention provides a solution to these problems in the form of a specific iron-containing polymeric material, obtainable by the process as also hereinafter described. The polymeric material unexpectedly demonstrates a reduced tendency towards fuel injector fouling, and provides a more favourable balance of physical properties both in the fuel and in concentrate form.

In particular, despite its polymeric nature, the polymeric material shows excellent stability in diesel fuel, in particular in the presence of de-stabilising elements such as lubricity additives. Upon addition to the fuel, the polymeric material remains distributed within the bulk fuel for extended periods, particularly at the elevated fuel temperatures typically seen in a diesel vehicle fuel tank, and which occur in operation of the engine through the partial recycling of excess warm fuel from the injection system via the fuel return line. A more uniform supply of regeneration additive within the fuel is enabled.

Furthermore, despite its polymeric nature, the polymeric material of the invention unexpectedly shows lower viscosity (at comparable iron concentrations) in concentrate form when compared with conventional iron salts used hitherto as regeneration additives. As a result, concentrates containing higher iron contents can be prepared, which better suit the requirements of on board dosing systems.

Furthermore, the polymeric material of the invention provides excellent regeneration of diesel exhaust particulate traps.

These advantages are further explained and demonstrated in the examples presented hereinafter.

U.S. Pat. No. 3,551,352 describes a catalytic inorganic polymer of silicon, oxygen and an iron group metal, and a method of making same. The polymer is described as a chemical combination comprising iron, oxygen and silicon in an amorphous, inorganic high molecular weight polymer-like material containing multiple and random Si—O—Si, Si—O—Fe, and Fe—O—Fe linkages. The catalyst finds utility in the conversion of mercaptans to disulfides in the processing of light petroleum distillates such as gasoline, a process known as 'sweetening'. The presence of silicon in such a composition is clearly taught as essential.

European Patent Application No. 1 344 813 describes the use of metal monocarboxylate salts as trap regeneration additives having improved storage stability. The monocarboxylate has a defined, branched structure with the preferred structure being neocarboxylate. Iron neodecanoate is exemplified. Other simple iron compounds are exemplified as comparatives, namely iron oleate, iron 2-ethylhexanoate and ferrocene (iron-bis(cyclopentadienyl)).

Neither of the above disclosures point towards the iron-containing polymeric material of the present invention, nor the combination of advantages it provides.

The review article by Donald M. Kurtz, Jr. of University of Georgia entitled "Oxo- and Hydroxo-Bridged Diiron Complexes: A Chemical Perspective on a Biological Unit" (referenced as *Chem. Rev.* 1990, 90, 585-606) summarises a number of known aspects of complexes based around the Fe—O—Fe 'diiron' structural unit. The article comments that the nature of the diiron species that results from hydrolysis of Fe(III)(aq) at pH>1 was controversial in 1974, and at the time of that article still had not been resolved. A variety of different bridging structures for the basic Fe—O—Fe unit have been postulated and/or evidenced.

The polymeric material of the present invention possesses a polymeric backbone consisting essentially of alternating iron and oxygen atoms, to which are coordinated specific organic ligands. The detailed structure of the backbone is not determined, given the variety of possible bridging structures within the repeating (Fe—O—Fe—O—) linkages, and the added complexity brought about by polymerisation. Thus, the material of the present invention may be as usefully defined in terms of its process of preparation.

In a first aspect therefore, the present invention provides a process for the preparation of an iron-containing polymer suitable for use as an additive in fuel, comprising the following steps
  i) obtaining or preparing an aqueous solution of one or more iron (III) salts;
  ii) adding thereto a weak base, in a stepwise manner, whilst continuously stirring the reaction medium over the course of base addition;
  iii) wherein the total amount of base added over the course of step ii) is such as to provide a molar ratio of iron to total base added in the range of 1:2.5 to 1:3.5, and to obtain a wet precipitate;
  iv) reacting the wet precipitate from step iii) under reflux, in an organic solvent, with a tertiary nitrogenous base and one or more polycarboxylic acids and/or derivatives thereof, the water evolved over the course of the reaction being removed;
  v) wherein at least one polycarboxylic acid and/or derivative employed in step iv) comprises a branched-chain hydrocarbyl substituent containing at least 14 carbon atoms, and wherein the total amount of all polycarboxylic acids and/or derivatives thereof employed in step iv) is such as to provide the reaction mixture with a molar ratio of iron to total carboxylic groups (including any derivatives thereof) in the range of 1:1 and 3:1; and
  vi) removing the resulting solid polymer material.

In a second aspect, the present invention provides the iron-containing polymer obtainable by, or obtained from, the process of the first aspect.

In particular, the present invention provides an iron-containing polymer consisting of a polymeric backbone from which a plurality of co-ordinating ligands depend, the backbone consisting of alternating iron and oxygen atoms in a chain-like structure optionally also bearing hydroxyl groups as pendant or bridging groups, and the coordinating ligands being polycarboxylate ligands and optionally also water molecules, wherein the polycarboxylate ligands comprise ligands having branched hydrocarbyl substituent groups containing at least 14 carbon atoms.

In a third aspect, the present invention provides an additive concentrate comprising the polymer of the second aspect and an organic solvent compatible therewith.

Further aspects of the invention include various fuel compositions, processes and methods as hereinafter described and claimed.

The preferred features and embodiments of the invention will now be described.

The Process (First Aspect of the Invention)

The process may be conducted using either one or more iron (II) or, preferably, one or more iron (III) salts (optionally in combination with one or more iron (II) salts) as starting material to provide the iron content of the polymer. If an iron (II) salt is chosen or included, the process requires an extra step ia) to oxidise the iron (II) to iron (III) before the subsequent steps are performed. This oxidation step may be conducted in situ in aqueous solution, preferably by exposure to air (for example, by bubbling air through the solution) or other oxidising agent.

The use of iron (III) salts obviates the need for this oxidation step ia) and is preferred from a process viewpoint. Nevertheless, the iron salt(s) of choice may be more practically available in Fe (II) form and thus, in an additional aspect, the invention also claims the process as generally described under the first aspect, but wherein step i) employs one or more iron (II) salt(s) (or a mixture of iron (II) and iron (II) salts) and wherein an additional step ia) permits or causes the oxidation of iron (II) ions to iron (III) ions by exposure to air and/or other oxidising agent. The process otherwise then proceeds as generally stated above.

The first part of the process is conducted in aqueous solution. The iron salt(s) used as starting material may thus generally be selected from those iron salts which readily form aqueous solutions upon addition to water. The salts may contain water of crystallisation. Preferred salts in the present process include the iron (III) salts of nitrate, halide, sulphate, acetate, acetylacetonate and oxalate as well as their iron (II) counterparts. More preferably, only iron (II) or iron (III) nitrate or halide is used in step i), wherein the halide salts are preferably iron (II) or iron (III) chloride or bromide. Most preferably, the iron salt is only iron (III) nitrate or an iron (III) halide, in particular iron (III) chloride or bromide. Iron (III) nitrate is most preferred.

The aqueous solution of the iron salt may be simply prepared by dissolving the salt in water under gentle stirring and, if necessary, under gentle heating to the desired concentration. Such practices are routine to the laboratory chemist.

Step ii) of the process employs a weak base. The essential purpose of the weak base is to prompt the formation of the iron intermediate product as hereafter described. In this specification and claims, the term 'weak base' should be interpreted to mean a base suitable for use in aqueous solution and which, when present in aqueous solution, does not ionise fully therein according to the equilibrium equation:

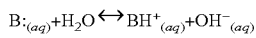

wherein B: represents the base and $BH^+_{(aq)}$ represents the ionized form thereof. Thus, a weak base is one where non-ionised base (B:) remains in aqueous solution.

Preferably, the weak base is one or more carbonates or hydrogen carbonates of sodium, potassium, magnesium, calcium or a quaternary ammonium cation. More preferably, the weak base is sodium or potassium carbonate or hydrogen carbonate, particularly sodium hydrogen carbonate; or ammonium carbonate or hydrogen carbonate, particularly ammonium carbonate.

The base may be added to the aqueous solution of iron salt either in solid form, or as an aqueous solution. If to be added as an aqueous solution, the solution can first be simply prepared dissolving the base in water under gentle stirring and, if necessary, under gentle heating to the desired concentration. Such practices are routine to the laboratory chemist. If added in solid form, the base may usefully first be ground or pulverised, to aid its dissolution in the aqueous reaction medium.

Importantly, the addition of the weak base must take place in a stepwise manner, under continual stirring of the reaction medium over the course of the base addition. As explained hereafter, the addition of base leads to reaction of the iron cations to form an intermediate product of particular structure. The formation of this structure is controlled by this manner of base addition.

Stepwise addition of the weak base ensures that this base is introduced progressively, and this progressive addition coupled with the continual stirring ensures that the added base is continually distributed throughout the solution. The formation of local regions of high base concentration (and hence high pH) is thus avoided. Avoiding local regions of high base concentration has been found to be important to obtaining the correct intermediate product.

In setting up the reaction hardware, the laboratory chemist should thus employ equipment which will allow the entire reaction mixture to be continually stirred during the base addition step. Formation of the intermediate product, as explained below, provides a convenient way of confirming the presence of adequate mixing conditions.

The relative proportions of aqueous iron and weak base are likewise important to obtaining the correct intermediate product. The total amount of weak base added over the course of step ii) of the reaction is such as to provide a molar ratio of iron to total base added in the range of 1:2.5 to 1:3.5. Preferably this ratio range is 1:2.75 to 1:3.25, more preferably 1:2.9 to 1:3.1. Optimally, the ratio is 1:3. In this specification and claims, this ratio should be understood to mean "moles of iron:moles of total base added", wherein "moles of iron" refers to the total number of moles of aqueous iron present in the starting solution obtained or prepared in step i), and "moles of total base added" refers to the total number of molar equivalents of base added in step ii).

Thus, for example, in a reaction between aqueous iron (III) nitrate and sodium hydrogen carbonate, the total addition of 3 moles of sodium hydrogen carbonate to 1 mole of iron (III) nitrate would provide a ratio of 1 mole of aqueous iron:3 moles of base (hydrogen carbonate anions), each mole of iron (III) nitrate providing 1 mole of aqueous iron, and each mole of sodium hydrogen carbonate providing 1 mole of monobasic hydrogen carbonate. Analogously, in a reaction between aqueous iron (III) nitrate and ammonium carbonate, the total addition of 1.5 moles of ammonium carbonate to 1 mole of iron (III) nitrate would also provide a ratio of 1 mole of aqueous iron:3 moles of base, each mole of ammonium carbonate providing 2 molar equivalents of base in view of the dibasic nature of the carbonate anion (as compared to the monobasic hydrogen carbonate anion). The ratio for other weak bases can be calculated analogously.

In conducting steps i) to iii) of the process of this invention, it is preferred to use an aqueous solution of iron (III) nitrate or an iron (III) halide as the starting material, and to add thereto sodium hydrogen carbonate or ammonium carbonate as the weak base.

In general, the stepwise addition of the correct relative amount of weak base under continual stirring leads to a highly exothermic reaction. The resulting solution effervesces and thereafter gives up a coloured precipitate from the aqueous medium. This precipitate is the desired, wet intermediate rich in iron. Consequently, the colour of the precipitate is brown or reddish brown to the normal eye.

From spectroscopic analysis, this intermediate has been determined to be a ferric oxide hydrate of polymeric structure, having a polymeric backbone consisting of alternating iron and oxygen atoms in a chain-like structure. The Fourier Transform infra-red (FT-IR) spectrum of this ferric oxide hydrate shows the characteristic signal of the bridging oxygen species —(Fe—O—Fe)— at an absorbance of 721 cm$^{-1}$. In addition, the presence of intermolecular hydrogen bonded water molecules is identified at an absorbance of 3374 cm$^{-1}$.

Thermo-gravimetric analysis (TGA) identifies the presence of 4 to 5 molecules of water per 'diiron' (Fe—O—Fe) backbone unit.

These results indicate the intermediate is a polymer corresponding to the following two generalised unit structures:

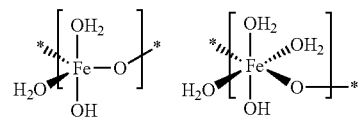

In particular, the presence of the water molecules within the hydrate, readily determined by FT-IR, appears important to the structure of the intermediate and achieving the subsequent reaction steps. The presence of co-ordinated water appears to stabilise the polymeric structure of the intermediate, permitting solvation and subsequent reaction with the correct ligands. The absence of this coordinated water, caused for example by drying or removal of volatiles at the end of step iii), renders the intermediate insoluble and incapable of adequate reaction with the desired ligands. The removal of water appears to cause an irreversible reconfiguration of the polymer structure, preventing effective re-solvation and reaction. As the review article by Donald M. Kurtz Jr (supra) shows, the possibility of numerous bridging structures between consecutive iron atoms may also account for the important role of water molecules in maintaining the appropriate intermediate structure.

In addition, the presence of hydroxyl groups may give rise to bridging structures.

For this reason, the wet precipitate obtained at the end of steps ii) and iii) should be used wet in step iv). Thus, at the end of step iii), the aqueous reaction medium can simply be decanted away and the wet precipitate used directly in step iv) or, preferably, first washed with water, for example with successive aliquots of water whilst supported on a filter medium, but without drying. The resulting washed precipitate appears as a dark red or reddish brown mass or paste to the normal eye, and can be used directly in step iv) of the reaction.

In the second part of the process, the ferric hydrate intermediate is refluxed in an organic solvent with a nitrogenous base and one or more polycarboxylic acids and/or derivatives thereof, the water evolved over the course of the reaction being removed. This part of the reaction achieves the co-ordination of the correct ligands to the polymeric intermediate.

Water is evolved over the course of the reaction step iv). Preferably, this water is removed continuously over the course of the reaction step iv), for example by distillation using suitable apparatus, such as a Dean-and-Stark assembly, which condenses and collects the distilled water away from the reaction mixture. In this preferred embodiment, the reaction is driven both by temperature and by the continual removal of the evolved water.

However, for reasons of manufacturing practicality the water evolved over the course of the reaction may also be allowed to collect in the reaction mixture before being removed at the end of step iv), for example by conventional liquid separation techniques. In this embodiment, the completion of the reaction in step iv) results in a two-phase liquid, one phase being aqueous and containing any aqueous bi-products, and the other (organic) solvent phase containing the desired polymer material. Separation of the aqueous phase may then be effected, leaving the polymer to be recovered from the solvent phase.

The choice of solvent for this part of the process is driven primarily by practicality. Thus, conventional organic media which provide boiling characteristics suitable for reflux reactions evolving water to be removed can be employed. Such solvents include the aromatic solvents toluene, xylene and commercially available mixed aromatic solvents such as the Solvesso and Shellsol series of industrial solvents; and the aliphatic solvents hexane, heptane and other alkanes. Toluene is the preferred solvent. Alternatively, the reflux reaction can be conducted in the aromatic or aliphatic solvent intended to be the eventual diluent in the additive concentrate.

The reflux is conducted at temperatures slightly above the normal boiling point of the chosen solvent, and above 100 degrees Centigrade, in order to drive the azeotropic removal of water. Thus, for example, when the solvent is toluene, the reflux reaction can usefully be carried out by heating to between 120 and 130 degrees Centigrade. Suitable temperatures for other solvents can be selected analogously.

The one or more polycarboxylic acids and/or derivatives used in step iv) of the invention react to form the co-ordinating ligands on the polymer backbone. It is essential to the invention that at least some of the polycarboxylic acids and any derivatives used in the reaction comprise at least one branched-chain hydrocarbyl substituent containing at least 14, and preferably at least 16, carbon atoms. Mixtures of acids may be used, provided that the requisite substituents are present on at least some of these acids.

As used within this specification and claims, the term 'hydrocarbyl substituent' means a monovalent chemical substituent having hydrocarbonaceous character, and consisting of carbon and hydrogen atoms (and optionally heteroatoms such as oxygen, nitrogen and sulphur, provided that the presence of such heteroatoms does not affect the hydrocarbonaceous character of the substituent). In each of the preferred embodiments of the polycarboxylic acid and/or any derivative thereof used in step iv), the hydrocarbyl substituent consists of carbon and hydrogen atoms (only), wherein the hydrocarbyl substituent is preferably a monovalent saturated (i.e. alkyl), or more preferably mono or poly-unsaturated substituent.

For optimal performance of the polymer it is preferred that all (or at least essentially all) of the polycarboxylic acids and any derivatives thereof used in step iv) comprise at least one, and preferably only one, branched-chain hydrocarbyl substituent containing at least 14 carbon, preferably at least 16, carbon atoms.

Thus, where a single acid or derivative is used, it is essential that the acid or derivative carries at least one, and preferably only one, branched-chain hydrocarbyl substituent containing at least 14, preferably at least 16, carbon atoms.

However, where more than one acid or derivative or both is used, it is preferred that the mixture of polycarboxylic acids or derivatives respectively (or any mixture of both) used in step iv) consists essentially of acids or derivatives (or both, where both are present) carrying at least one, and preferably only one, branched-chain hydrocarbyl substituent containing at least 14, preferably at least 16, carbon atoms.

Thus, for example, where a technical grade mixture of polycarboxylic acids is used, such as a commercial mixture of octadecenyl succinic acids containing a mixture of isomeric acids differing in the structure of their octadecenyl substituent, it is preferred that such a mixture consists essentially of branched-chain isomers of octadecenyl succinic acid. However, small amounts of straight chain isomers can be tolerated in such mixtures, provided the overall properties of the polymer are not adversely affected.

The maximum size of such branched-chain substituents is 160 carbon atoms, preferably 80 carbon atoms. More preferably, the branched-chain substituents contain no more that 30 carbon atoms, and most preferably no more than 24 carbon atoms. Branched-chain substituents containing 18 carbon atoms are most preferred.

The reaction proceeds via the conversion of the carboxylic acid groups (or the derivatised forms thereof) into carboxylate groups, which then co-ordinate with the polymer backbone as hereafter described. Thus, the exact nature of any carboxylic derivative used is unimportant, provided that in the presence of water and the tertiary nitrogenous base, the derivative reacts or reverts to carboxylate form. Thus, for example, derivatives such as esters and anhydrides are especially suitable for this purpose. Anhydrides are most preferred.

Where a mixture of more than one derivative is used, the derivatives therein may be the same chemical derivative of different polycarboxylic acids, or may be different chemical derivatives of the same polycarboxylic acid, or may be both. Likewise, where mixtures of at least one acid and at least one derivative are used, the derivative(s) therein may be derived from polycarboxylic acid(s) different to those acid(s) also present in the mixture, or may be chemical derivatives of the same acid(s) present in the mixture, or may be both.

Preferably, the polycarboxylic reactant used in step iv) is a mixture of polycarboxylic acids, or a mixture of polycarboxylic anhydrides, or a mixture of both. More preferably, the polycarboxylic reactant used in step iv) is a mixture of dicarboxylic acids, or a mixture of dicarboxylic anhydrides, or both. In combination with these preferred and more preferred embodiments, it is also preferred that each of these mixtures consists essentially of, and preferably consists of, polycarboxylic acids or polycarboxylic anhydrides (and especially dicarboxylic acids or dicarboxylic anhydrides) which carry only one branched-chain hydrocarbyl substituent containing at least 14, and more preferably containing between 16 and 20, carbon atoms.

Most preferably, the polycarboxylic reactant used in step iv) is a mixture of dicarboxylic acids, or dicarboxylic anhydrides, or a mixture of both, wherein each acid is a substituted succinic acid and each dicarboxylic anhydride is a substituted succinic anhydride, and wherein the mixtures consist essentially of (and preferably consist of) succinic acids and anhydrides which carry only one branched-chain hydrocarbyl substituent containing at least 14, and more preferably at least 16, carbon atoms.

In this preferred embodiment, the substituent on each succinic acid or anhydride may be derived from polymerised olefins, such as polyethylene, polypropylene or (preferably) polybutylene such as polyisobutene. A preferred substituent is derived from polyisobutene of number average molecular weight (as measured by gel permeation chromatography ('GPC') against polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s) or anhydride(s).

However, particularly advantageous properties within the above embodiment are obtained when branched-chain hydrocarbyl substituent contains between 16 and 20 carbon atoms. Preferred reactants are mixtures of hexadecenyl-succinic acids and/or anhydrides thereof, or mixtures of hexadecenyl-substituted succinic acids and/or anhydrides thereof, or mixtures of both. Preferably, mixtures of anhydrides are used. A mixture of octadecenyl-substituted succinic acid anhydrides is most preferred. Such mixtures consist essentially of acids or derivatives respectively carrying single hexadecenyl and octadecenyl substituents possessing a branched-chain structure, such as are obtained from the reaction of maleic anhydride with commercial mixtures of olefins having at least one internal double bond. Thus, such mixtures consist essentially of mixtures of isomeric compounds, the isomers differing in the exact nature of the branched structure of their substituent.

A further highly-preferred embodiment of the present invention is that obtain by employing in step iv) one or more dicarboxylic acid anhydride derivatives of the structure (I):

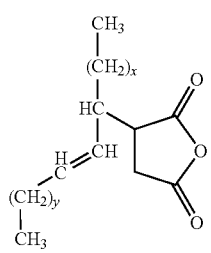

wherein x and y are independent integers whose sum is 9 to 29, preferably 11 to 21, and more preferably 11 or 13. Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

The nature of the branched-chain hydrocarbyl polycarboxylate ligand is an important feature of the present invention. Only polymers with ligands originating from polycarboxylic acids (or derivatives thereof) having branched-chain substituents with at least 14 (preferably, at least 16) carbon atoms provide the combination of advantages previously described, for the following reasons.

Firstly, the process of the invention proceeds poorly when carboxylic acids or derivatives carrying shorter branched chain substituents are used in step iv). Thus, as illustrated in the examples which follow, acids carrying branched chain substituents with less than 14 carbon atoms give poor yields in the process of the invention. These yields are too low to be practicable, and may result from steric factors consequential to side branch(es) on a short main chain. In contrast, longer chain substituents give greatly-increased yields.

Secondly, monocarboxylic acids carrying only straight chain substituents do not bring the necessary advantageous properties to the polymer, if used as coordinating ligands. Thus, despite having long hydrocarbyl chains, comparative polymers prepared from such straight-chain ligands show poor solubility in concentrate form, and rapidly precipitate out, as also illustrated in the examples which follow. Such materials are not practicable for use in additive concentrates, either in on-board storage applications or even for supply to fuel manufacturers in concentrates for use in bulk (refinery or terminal) fuel-blending operations.

The tertiary nitrogenous base serves as a promoter for the reaction. It is essential that a tertiary nitrogen compound is used, as secondary or primary nitrogenous bases possess replaceable hydrogen atoms and can thus react directly with the carboxylic groups (or derivatives thereof) of the polycarboxylic acid reactant(s) to form amides and/or imides, this side-reaction depleting the reaction medium of base and disrupting the primary reaction. Any tertiary nitrogenous base can be employed, although the preferred bases are tertiary hydrocarbyl amines, such as trialkyl amines. Triethyl amine is especially preferred.

Alternatively, tertiary bases such as N-substituted morpholines or piperidines may be used.

The amount of tertiary nitrogenous base to be added to the reaction medium can be chosen in accordance with normal laboratory practices. However, typically the tertiary nitrogenous base is employed in amounts such that the molar ratio of this base to total carboxylic groups (including any derivatives thereof) originating from the polycarboxylic acids and/or derivatives thereof is in the range of 1:1 to 3:1, more preferably 1:1 to 2:1, and most preferably is 2:1.

During the reflux reaction, the carboxylic acid(s) (and/or derivatives thereof) attach to the polymeric backbone by virtue of the formation of carboxylate groups, which thereafter co-ordinate with the iron atoms present in the polymer backbone. In this reaction, the water present within the intermediate structure appears important not only for holding the polymer chain in an open configuration, permitting solvation and reaction, but also appears to act as promoter or reactant to permit the formation of carboxylate groups. Thus, for example, where polycarboxylic anhydrides such as succinic anhydrides are used, the presence of water permits the opening of the anhydride ring into a dicarboxylate structure, whereupon both carboxylate groups can complex with iron atoms in the polymer backbone in multidentate ligand fashion.

The structural result of this carboxylate formation and subsequent co-ordination is essentially a series of bridging (μ-carboxylato) groups on adjacent iron atoms along the polymer backbone. Thus, each individual μ-carboxylato group can generally be depicted as:

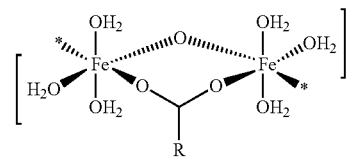

wherein the two oxygens of an individual carboxylate group co-ordinate to adjacent iron centres (i.e. a 'diiron' unit). In addition, however, the essential use of polycarboxylic acids (or derivatives) as the source of the carboxylate groups for this invention results in the side-chain ('R') regions of adjacent (μ-carboxylato) groups themselves being connected within the remainder of the polycarboxylic acid molecule, thus creating a higher-order repetitive unit.

Thus, for example, the use of a mono-substituted succinic anhydride reactant results in the formation of succinic dicarboxylate. Each succinic dicarboxylate molecule is thereafter able to complex to four adjacent irons, via the formation of two adjacent (μ-carboxylato) groups spanned by the remainder of the succinic acid moiety, creating a four iron structural 'unit'.

It is this polycarboxylic acid-derived repetitive structure, in combination with the presence of the defined branched-chain hydrocarbyl substituent group(s) on at least a proportion (and preferably on all) of the polycarboxylic acid(s), which appears essential to obtaining the beneficial combination of properties of the polymer of the present invention. The process of this invention offers a particularly advantageous route to such materials.

Within all aspects of the invention, it is particularly preferred that the or each polycarboxylate ligand is a dicarboxylate ligand. Dicarboxylate ligands have been found to be particularly advantageous in the invention, and have been found to give particularly favoured polymers, by virtue of the formation of the repeating four iron structural unit.

Likewise, it is particularly preferred that the carboxylate groups within each polycarboxylate (preferably dicarboxylate) ligand are closely positioned relative to each other. This facilitates the co-ordination of each carboxylate group to adjacent iron centres. Within all aspects of the invention, it is particularly preferred that within a ligand molecule the carbonyl carbon atoms of each carboxylate group are connected to each other by at most 6, more preferably by at most 4, and most preferably by only 2 or 3 chemical bonds. Thus, in the example of a succinic acid, the two carbonyl carbons are connected by three chemical bonds.

Within the bridging ($\mu$-carboxylato) groups, the molar ratio of iron to total carboxylate groups is 2:1. Thus, in step iv) of the reaction, it is optimal that the total amount of all polycarboxylic acids and/or derivatives thereof (i.e. the total amount of all species contributing carboxylate groups to the reaction) used is such as to provide the reaction mixture with a molar ratio of iron to total carboxylate groups of 2:1. Some tolerance around this optimum is permitted, namely between the range of 1:1 and 3:1.

Since the polymer backbone has some capability to co-ordinate with additional carboxylate centres, the presence of a moderate quantity of carboxylate in excess of that required to provide the optimum 2:1 ratio can be accommodated. However, the presence of greater amounts of carboxylate will ultimately prove wasteful and result in free acid being present within the mixture at the end of reaction, complicating retrieval of the polymer.

However, the presence of lesser amounts of carboxylate will prevent the completed formation of the sought-after structural unit. To ensure the presence of a substantial number of bridging ($\mu$-carboxylato) groups on the polymer, the total amount of all polycarboxylic acids and/or derivatives thereof (i.e. the total amount of all species contributing carboxylate groups to the reaction) used in step iv) is such as to provide the reaction mixture with a molar ratio of iron to total carboxylate groups within the range of 1:1 to 2:1, more preferably 1:1.5 to 2:1. The ratio of 2:1 is most preferred.

In the reflux reaction, the rate of conversion of the free acid (absorbance at 1705 $cm^{-1}$ by FT-IR) to bridging ($\mu$-carboxylato) group can be monitored by FT-IR to ascertain the progress of the reaction. These changes in the FT-IR spectra appear to correspond with a shift in bond energy when the un-coordinated alternating iron-oxygen backbone in the intermediate becomes coordinated with the bridging $\mu$-carboxylate. This co-ordination causes shifts in wavenumber for the Fe—O and the carbonyl peaks respectively, which signals decrease by approximately 20 to 30 $cm^{-1}$, and 145 $cm^{-1}$, respectively. Thus, in the case of the reaction using octadecenyl succinic anhydride for example, the FT-IR peak for Fe—O in the intermediate is typically about 721 $cm^{-1}$, and moves to about 704 $cm^{-1}$, whilst the carbonyl peak likewise moves to about 1560 $cm^{-1}$ as the bridging ($\mu$-carboxylato) group forms. In analogous reactions with hexadecenyl succinic anhydride and polyisobutylenyl anhydride, the Fe—O peak moves to approximately 699 and 692 $cm^{-1}$ respectively, whilst the carbonyl peak again shifts to about 1560 $cm^{-1}$.

Following the reflux reaction, the final solid polymeric product is removed from the reaction medium. If desired, the medium containing the product may first be filtered, and the solid product is thereafter typically recovered by removing the solvent under vacuum. The material may be further washed with solvent if so required, for example to remove any impurities.

Following the preparation of the final polymeric product, its metal content can also be determined by Inductively Coupled Plasma (ICP) spectrometry. The figure thus obtained experimentally can be compared to that theoretically derived from the expected repetitive structure, to confirm the formation of the desired product.

The Product (Second Aspect of the Invention)

The product of the invention is that material obtainable by, and preferably obtained by, the process of the first aspect of the invention.

In particular, the product contains the general, repetitive ($\mu$-carboxylato) group structure hereinbefore described and derived from the polycarboxylate ligands. Given the hydrated nature of the intermediate product, it is likely that the final product also retains an element of hydration within its co-ordination sphere, even when contained within organic solvent in concentrate form. However, this is not considered to inhibit the performance of the final polymer.

Thus, the product may be generally described as an iron-containing polymer consisting of a polymeric backbone from which a plurality of coordinating ligands depend, the backbone consisting of alternating iron and oxygen atoms in a chain-like structure optionally also bearing hydroxyl groups as pendant or bridging groups, and the co-ordinating ligands being polycarboxylate ligands and optionally also water molecules, wherein the polycarboxylate ligands comprise ligands having branched hydrocarbyl substituents containing at least 14 carbon atoms.

Within the polymer, it is important to note (as explained in respect of the process aspect of the invention) that more than one kind of substituted polycarboxylate ligand can be present. Thus, the polymer may be prepared from mixtures of polycarboxylic acids and/or derivatives thereof giving rise to polymers possessing a variety of polycarboxylic ligands and/or substituent groups. Thus, whilst it is essential that the polycarboxylate ligands on the polymer comprise some ligands having at least one branched-chain hydrocarbyl substituent containing at least 14, (preferably at least 16) carbon atoms, it is not essential that all ligands have such substituents. Mixtures of ligands may thus be used, provided that the requisite substituents are present on at least some of these acids.

However, for optimal performance of the polymer it is preferred that all (or at least essentially all) of the polycarboxylate ligands comprise at least one, and preferably only one, branched-chain hydrocarbyl substituent containing at least 14 carbon, preferably at least 16, carbon atoms.

Thus, where a polycarboxylate ligand is used, it is essential that the ligand carries at least one, and preferably only one, branched-chain hydrocarbyl substituent containing at least 14, preferably at least 16, carbon atoms.

However, where more than polycarboxylate ligand is used, it is preferred that this mixture of ligands consists essentially of ligands carrying at least one, and preferably only one, branched-chain hydrocarbyl substituent containing at least 14, preferably at least 16, carbon atoms.

Thus, for example, where a technical grade mixture of polycarboxylic acids is used in step iv) of the reaction, such as a commercial mixture of octadecenyl succinic acids containing a mixture of isomeric acids differing in the structure of their octadecenyl substituent, it is important that the acid mixture consists essentially of branched-chain isomers of octadecenyl succinic acid, so that the ligand mixture consists essentially of branched-chain isomers of octadecenyl succinate. However, small amounts of straight chain isomers can be tolerated in such mixtures, provided the overall properties of the polymer are not adversely affected.

The maximum size of the branched-chain substituent(s) on the ligand(s) is 160 carbon atoms, preferably 80 carbon atoms. More preferably, the branched-chain substituents contain no more that 30 carbon atoms, and most preferably no more than 24 carbon atoms, especially 18 carbon atoms.

Preferably, the polycarboxylate ligands present on the polymer are a mixture of dicarboxylate ligands, preferably consisting essentially of, and more preferably consisting of, dicarboxylate ligands having only one branched-chain hydrocarbyl substituent containing at least 14, and more preferably at least 16, ideally between 16 and 20, carbon atoms.

Most preferably, the polycarboxylate ligands present on the polymer are a mixture of dicarboxylate ligands consisting essentially of (and most preferably consisting of) succinate ligands which carry only one branched-chain hydrocarbyl substituent containing at least 14, and more preferably at least 16 carbon atoms.

In this preferred succinate embodiment, the substituent on each succinate ligand may be derived from polymerised olefins, such as polyethylene, polypropylene or (preferably) polybutylene such as polyisobutene. A preferred substituent is derived from polyisobutene of number average molecular weight (as measured by GPC, using polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s) or anhydride(s).

However, particularly advantageous properties within the above succinate embodiment are obtained when branched-chain hydrocarbyl substituent on the ligand contains between 16 and 20 carbon atoms. Such ligand mixtures preferably consist essentially of succinates carrying single hexadecenyl and octadecenyl substituents possessing a branched-chain structure, such as are obtained from the reaction of maleic anhydride with commercial mixtures of olefins having at least one internal double bond. Thus, such mixtures consist essentially of mixtures of isomeric compounds, the isomers differing in the exact nature of the branched structure of their substituent.

A further highly-preferred embodiment of the present invention is that polymer bearing succinate ligands derived from one or more dicarboxylic acid anhydride derivatives of the structure (I) below, wherein x and y are independent integers whose sum is 9 to 29, preferably 11 to 21, and more preferably 11 or 13.

Structure (I):

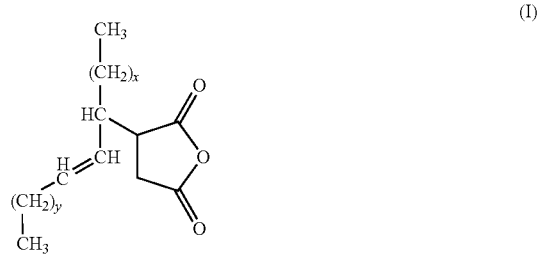

Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

Most preferably, each dicarboxylic ligand is the dicarboxylate of a branched-chain substituted succinic acid structure, preferably an octadecenyl- or hexadecenyl-succinic acid or polyisobutenyl-succinic acid structure. Most preferably, each dicarboxylic ligand is the dicarboxylate of an octadecenyl-succinic acid. In this respect, the preferred succinic acid structures are those described hereinbefore in relation to the process of the first aspect.

The polymer can be further characterised by reference to the FT-IR peaks described hereinbefore in relation to the process.

As described above, the polymer of the present invention takes the form of a polymeric backbone of alternating iron and oxygen atoms, co-ordinated with depending ligands. The polymer thus differs fundamentally from particular forms of iron oxide (such as crystalline particles) in which arrays of iron and oxygen atoms form a lattice-like structure, with many iron and oxygen atoms internal to the lattice being fully co-ordinated only to each other.

The Concentrate (Third Aspect of the Invention)

The final product can thereafter be blended into concentrate form suitable for use as an additive.

Thus, in a further aspect the present invention concerns an additive concentrate comprising the polymer described above, or the polymer obtainable or obtained by the process described above, in an organic solvent compatible therewith.

The polymer concentrate of the invention can be made to concentration levels suitable for use in bulk fuel manufacture or blending operations at refineries or fuel terminals. In such concentrates, the polymer is typically present in concentrations containing up to 25% iron by weight, and preferably between 5 and 20%, more preferably between 5 and 15% by weight, per weight of concentrate.

Additionally, the polymer concentrate of the invention can be made to high concentration levels suitable for long-term use in on board dosing systems. As previously explained, such dosing systems require the concentrate to remain homogeneous for extended periods, to permit consistent operation of the trap regeneration system. In such concentrates, the polymer is also typically present in concentrations containing up to 30% iron by weight, and preferably between 5 and 25%, more preferably between 5 and 20% by weight, per weight of concentrate.

Suitable solvents for the concentrate of the invention include aromatic solvents such as the commercial mixed aromatic solvents Solvesso and Shellsol, and aliphatic solvents such as isoalkanes, including Isopar L. Other suitable solvents known in the additives art may be used.

The concentrate can be simply prepared by mixing or blending the selected solvent and polymer in a suitable laboratory or industrial mixing device, such as a waring blender or blending plant.

In the concentrate aspect of the invention, the additional presence in the concentrate of hydrocarbyl alcohol causes a further advantageous improvement in concentrate stability, i.e. the ability of the concentrate to remain homogeneous over time in storage. In this respect, $C_1$ to $C_{20}$ alkanols are particularly preferred. Isodecyl alcohol has been found to be highly advantageous when present in the polymer in concentrate form, especially in combination with aliphatic solvents such as Isopar L.

Other Aspects of the Invention

The polymer of the invention, and the concentrate containing it, are useful in fuel as an additive promoting the combustion of carbonaceous material originating from the fuel.

Thus, in a further aspect, the invention provides a fuel composition comprising a fuel (being derived either from a petroleum source or from oils or fats of animals and/or plants, or being a mixture of both) and the polymer of the second aspect of the invention, wherein the polymer is present in the fuel composition in an amount effective to improve the combustion of carbonaceous material originating from the fuel when the fuel composition is used in a combusting device.

The fuel is preferably either a diesel fuel or a fuel for use in domestic or industrial power generation or heating. Preferably, the polymer is used in this aspect to reduce the amount of particulate or smoke emissions generated during combustion within the primary combustion chamber of the device. This use in turn permits the operation of the device at lower air:fuel ratios, so reducing heat losses through the flue and increasing the efficiency of useful heat transfer in the system.

In use as an additive, the polymer is typically added in concentrate form to assist handling. The amount of concentrate added per unit of fuel is normally such as to provide to the fuel with a specified or target fuel iron content. For use as a combustion improver additive in marine diesel fuels, the concentrate may be added for example in amounts such as to provide the fuel with between 20 and 100, more preferably between 30 and 50, ppm of iron by weight, per weight of fuel. For use as a combustion improver in heating oil, the concentrate may be added for example in amounts such as to provide the fuel with between 5 and 50, more preferably between 10 and 30, ppm of iron by weight, per weight of fuel.

The polymer of the invention, and the concentrate containing it, find particular utility in diesel fuel as an additive promoting regeneration of diesel exhaust particulate traps.

Thus, in a further aspect, the invention provides a diesel fuel composition for use in a diesel engine system comprising an exhaust particulate trap, comprising:
a. diesel fuel, being derived either from a petroleum source, or from oils or fats of animals and/or plants; or being a mixture of both; and
b. the polymer of the second aspect of the invention,
wherein the polymer is present in the fuel composition in an amount effective to promote regeneration of the particulate trap in operation of the engine system.

For general use as a regeneration additive in diesel engines, especially for passenger cars, the concentrate may be added for example in amounts such as to provide the fuel with between 1 and 20, more preferably between 2 and 12, ppm of iron by weight, per weight of fuel. Higher levels of iron may be used, up to 25 or 30 ppm of iron by weight, per weight of fuel, but may not provide additional advantages for regeneration.

Where the concentrate is used in bulk fuel manufacture or blending operations, the treated fuel so produced finds primary utility in diesel engine systems comprising an exhaust particulate trap. In this aspect, the invention additionally provides a method of regenerating a diesel exhaust particulate trap fitted to a diesel engine-powered device, comprising the operation of said engine on the fuel composition defined above.

The diesel fuel (a.) to be treated with additive may be a petroleum-based diesel fuel oil. Such diesel fuel oils generally boil within the range of from 110° C. to 500° C., e.g. 150° C. to 400° C. The fuel oil may comprise atmospheric distillate or vacuum distillate, cracked gas oil, or a blend in any proportion of straight run and thermally and/or refinery streams such as catalytically cracked and hydro-cracked distillates.

Other examples of diesel fuel oils include Fischer-Tropsch fuels. Fischer-Tropsch fuels, also known as FT fuels, include those described as gas-to-liquid (GTL) fuels, biomass-to-liquid (BTL) fuels and coal conversion fuels. To make such fuels, syngas ($CO+H_2$) is first generated and then converted to normal paraffins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types to arrive at a fuel suitable for use as diesel fuel.

Suitable examples of diesel fuel derived from oils or fats of animals and/or plants are those derived from rapeseed oil, coriander oil, soybean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include oils derived from corn, jute, sesame, shea nut, ground nut and linseed oil and may be derived therefrom by methods known in the art. Rapeseed oil, which is a mixture of fatty acids partially esterified with glycerol is available in large quantities and can be obtained in a simple way by pressing from rapeseed. Recycled oils such as used kitchen oils are also suitable.

Also suitable are alkyl ester derivatives of the fatty acid constituents of animal and plant oils and fats. Such esters can be obtained conventional means, for example by trans-esterification, or by saponification followed by re-esterification. Consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred lower alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, coriander, castor, soybean, peanut, cotton seed, beef tallow etc. Alkyl esters of fatty acids based on a variety of rapeseed oil, the fatty acid component of which is derived to more than 80 wt % from unsaturated fatty acids with 18 carbon atoms, are preferred.

Whilst many of the above oils may be used, preferred are vegetable oil derivatives, of which particularly preferred biofuels are alkyl ester derivatives of rapeseed oil, cottonseed oil, soybean oil, sunflower oil, olive oil, or palm oil, rapeseed oil methyl ester being especially preferred.

At present, fuels derived from oils or fats of animals and/or plants are most commonly used in combination with petroleum-derived fuels. The present invention is applicable to mixtures of such fuels in any ratio. For example, at least 2% and preferably at least 5%, more preferably at least 25%, for example more than 50% by weight of these fuel mixtures may be derived from a plant or animal source.

The diesel fuel may be a fuel for a road vehicle. Such fuels are typically classified in Europe by various well-known industry standards and can contain low or very low sulphur contents, such as at most 50 ppm sulphur, or even at most 10 ppm of sulphur or less by weight, per weight of fuel.

The fuel may alternatively be a marine diesel fuel, in particular having one or more of the following characteristics:

(i) a 95% distillation point (ASTM D86) of greater than 330° C., preferably greater than 360° C., more preferably greater than 400° C., and most preferably greater than 430° C.;

(ii) a cetane number (measured by ASTM D613) of less than 55, such as less than 53, preferably less than 49, more preferably less than 45, most preferably less than 40, (iii) an aromatic content of greater than 15% wt, preferably greater than 25% and more preferably greater than 40%; and (iv) a Ramsbottom carbon residue (by ASTM D 524) of greater than 0.01% mass, preferably greater than 0.15% mass, more preferably greater than 0.3% mass, such as 1% or 5% mass, and most preferably greater than 10% mass.

As described earlier, such diesel fuels (and particularly such marine diesel fuels) may in particular contain streams such as streams produced from fluid catalytic cracking, such materials usually having a density@15° C. of 850 to 970, such as 900 to 970 kg/m$^3$ and characterised by low cetane number values, typically ranging from 10 or lower to around 30 to 35; from thermal cracking processes, like visbreaking and coking, such streams typically having a density range@15° C. of 830 to 930 k g/m$^3$ and a cetane value of 20 to 50; and from hydrocracking that uses severe conditions, e.g. temperature in excess of 400° C. coupled with pressures of 130 bars or greater, to produce streams characterised by cetane number from 45 to 60 and having a density range@15° C. from 800 to 860 kg/m$^3$.

Typically, marine fuels accord with the standard specification ASTM D-2069 and may be either distillate or residual fuels as described within that specification, and may in particular have sulfur contents of greater than 0.05%, preferably greater than 0.1%, more preferably greater than 0.2% and particularly greater than 1% or even 2% by weight, especially in the case of residual fuel oils, and a kinematic viscosity at 40° C. in cSt of at least 1.40.

The fuel compositions of the invention may also contain other additives. A particular advantage of the composition of the invention is the resistance to destabilisation that the polymer offers when the fuel composition additionally comprises a lubricity additive, particularly where such additive is the mono- or bis-glycol (or polyglycol) ester of a polycarboxylic acid (and especially of a dicarboxylic acid, such as a dimer of unsaturated fatty acids such as oleic acid). Such compositions show improved stability and provide the fuel user with more reliable operation in the method aspect stated above.

The lubricity additive is typically present in amounts in the range of 25 to 500 ppm, preferably 50 to 250 ppm, and more preferably 100 to 200 ppm by weight per weight of fuel.

As an alternative to the above, where the concentrate is used in on board dosing systems the invention provides additional aspects.

Firstly, the invention provides a method of regenerating the diesel exhaust particulate trap of a diesel engine-powered device fitted with on board means for the storage of additive and the dosing of fuel therewith, comprising the use of the additive concentrate of claim 22 as the stored additive, and the dosing of same into the fuel in amounts effective to promote regeneration of the particulate trap in operation of the engine.

Secondly, the invention additionally provides a method of reducing particulate emissions from the diesel engine system of a diesel engine-powered device, comprising:

a. if necessary, the addition to the diesel engine system of a diesel exhaust particulate trap;

b. the fitting to the device of on board means for the storage of additive and the dosing of fuel therewith; and c. the use therein of the additive concentrate of claim 22, wherein the on board means dose the additive concentrate into the fuel in an amount effective to promote regeneration of the particulate trap in operation of the engine system.

The device in these aspects may be any device employing diesel-engine power. Thus, whilst such devices include inter alia forms of transport such as road vehicles, trains and marine craft, the devices also include stationary engine devices such as generators, pumps and traction equipment, and in particular devices used in restricted or highly pollution-controlled environments such as mines and factories.

Preferably however, the devices are road vehicles, trains and marine craft, in particular diesel engine road vehicles such as trucks and passenger cars.

A variety of on board means for storage and additive dosing are known in the art. Such equipment comprises an additive reservoir in fluid communication with a dosing device, the dosing device in turn being in fluid communication with the fuel system of the engine and serving to dispense the dose of additive into the fuel. The dosing device may dispense additive continuously, for example into the fuel line, or discontinuously, for example into the engine fuel tank at periodic refueling events. The device may be suitably adapted to improve dispersion of the additive upon addition to the fuel. The frequency of dosing, and the metered quantity of additive to be dosed, may be controlled by electronic systems on the vehicle, or by mechanical means.

Alternatively, the additive may be sprayed directly into the exhaust system of the engine, or into each combustion chamber of the engine during its non-combustion phase, such addition being moderated by the engine management system and the particulate signature of the engine.

A particular utility of the polymer of the present invention is its ability to form highly concentrate solutions having viscosities suitable for deployment in simple dosing devices.

The invention also provides the use of the polymer concentrate in a fuel dosing system on board a diesel engine-powered device equipped with a diesel exhaust particulate trap, to promote regeneration of the trap in operation of the engine.

The invention will now be further explained by means of the following, non-limiting examples.

EXAMPLES

The following examples illustrate the process of preparation of the iron-containing polymer and the concentrate, and explain and demonstrate the advantages of the polymer of the invention. These examples are presented in the following sequence:

A. Preparative Examples

Example 1—example preparation of the iron-containing polymer (from Fe (III) chloride)

Example 2—further examples (and comparative examples) of iron-containing polymers prepared from Fe (III) chloride Example 3—preparation of additive concentrates comprising the polymers Example 4—example preparations of the iron-containing polymer (from Fe (III) nitrate)

B. Working Examples

Example 5—demonstration of the polymer's improved ability to remain distributed within the bulk fuel over time (stability)

Example 6—demonstration of the viscosity advantage provided by the polymer concentrate Example 7—demonstration of the polymer's lower tendency to cause fuel injector deposits Example 8—demonstration of the polymer's ability to regenerate a particulate trap The examples are presented as illustrative of the invention only.

A. Preparative Examples

Example 1

Example Preparation of the Iron-Containing Polymer (from Fe (III) Chloride)

An aqueous solution of $NaHCO_3$ (16.8 g (0.2 mol) of $NaHCO_3$ in 30 ml of $H_2O$) was added drop-wise to an aqueous solution of $FeCl_3$ (10 g (0.062 mol) of $FeCl_3$ in 10 ml of $H_2O$) in a 250 ml glass beaker, with continuous stirring over the course of the addition. The highly exothermic reaction resulted in an effervescing orange solution, which gave up an insoluble brown precipitate on completion of the weak base addition.

Fourier transform infra-red spectroscopy (FT-IR) on a sample of the precipitate showed the characteristic signal of the diiron bridging species Fe—O—Fe (at approximately 721 $cm^{-1}$) as well as intermolecular hydrogen bonded water molecules (at approximately 3374 $cm^{-1}$).

This intermediate product was transferred to a 250 ml round-bottomed flask to which was added toluene (100 ml), octadecenyl-succinic anhydride (5.43 g, 0.0155 mol) and tri-ethyl amine (5.72 ml, 0.031 mol). A Dean-and-Stark apparatus was attached, and the reaction mixture refluxed for approximately six (6) hours until all the resulting water had been removed. The product of reaction, now dissolved in the toluene, was filtered through a sinter funnel and the solvent removed in vacuo to yield a dark brown solid material containing 27% iron by mass, as measured by Inductively Coupled Plasma (ICP) spectrometry. This material is designated Polymer 1.

The octadecenyl-succinic anhydride reactant employed in the above reaction contained a mixture of isomers having $C_{18}$ branched chain hydrocarbyl substituents, obtained as a commercial product of the reaction between maleic anhydride and a mixture of $C_{18}$ olefin isomers having one or more internal double bonds.

During the reflux reaction, the anhydride ring is believed to open by the action of the residual water present. The conversion of the resulting carboxylic acid groups into bridging (μ-carboxylato) groups, as promoted by the tertiary nitrogenous base, can be monitored by Fourier Transform infra-red spectroscopy (FT-IR) to follow the progress of the reaction. The acid group absorbance peak (at 1705 $cm^{-1}$) transforms into the (μ-carboxylato) peak at an absorbance of 1559 $cm^{-1}$. At the same time, the Fe—O—Fe peak at 721 $cm^{-1}$ shifts to approximately 704 $cm^{-1}$ as the Fe—O backbone becomes co-ordinated with the dicarboxylate species.

In the base addition stage of the process, the iron from the iron (III) chloride starting material was transformed into the polymeric iron intermediate in a conversion rate of approximately 78%. Consequently, in the reflux reaction, the molar ratio of iron (78% of 0.062 moles) to total carboxylic groups (0.031 moles) was proportionately less than 2.

Example 2

Further Examples (and Comparative Examples) of Iron-Containing Polymers Prepared Analogously to Polymer 1

The preparative process of example 1 above was repeated eight times, with the exception that in each case the octadecenyl-succinic anhydride reactant was substituted by one of the alternative carboxylic acids or derivatives listed below, each being used in such individual amounts as to provide the same total number of moles of carboxylic groups as used in example 1. Thus, a series of analogous polymer compositions were prepared differing only in their ligand structure. The following polymers were prepared:

| Designation | Type of Example | Carboxylic reactant | ν(Fe—O) | ν(C=O) |
|---|---|---|---|---|
| Polymer 2 | Of the invention | Hexadecyl-succinic anhydride | 699 | 1560 |
| Polymer 3 | Of the invention | Polyisobutenyl-succinic anhydride* | 692 | 1560 |
| Polymer 4 | Comparative | Dodecenyl-succinic anhydride | 700 | 1539 |
| Polymer 5 | Comparative | Oleic acid | 698 | 1521 |
| Polymer 6 | Comparative | Lauric acid | 698 | 1541 |
| Polymer 7 | Comparative | Decanoic acid | 698 | 1523 |
| Polymer 8 | Comparative | Neo-decanoic acid | 696 | 1542 |
| Polymer 9 | Comparative | Isostearic acid | 695 | 1541 |

*polyisobutylene group having a number average molecular weight (Mn) of 950, as measured by GPC against polyisbutylene standards.

The ν(Fe—O) $cm^{-1}$ and ν(C=O) $cm^{-1}$ values in the table represent those absorbances (as measured by FT-IR) characterising each final polymer, i.e. after co-ordination with the respective carboxylate species.

These examples and comparative examples are used in examples 5 and 7 hereafter to assist the demonstration of the advantages provided by the present invention.

When comparing polymer iron contents as measured by ICP spectrometry, and calculating the weight percentage conversions of iron from the iron (III) chloride reactant into polymer-bound iron, it was apparent that the conversion achieved in the preparation of Polymer 8 (using neodecanoic acid) was poor, with only 20% of the iron in the Fe(III) chloride reactant being converted into polymer, in contrast to the iron conversions in the preparations of Polymer 7 (decanoic acid) and Polymer 6 (lauric acid) which both exceeded 99%. Similarly, dodecenyl-succinic anhydride (Polymer 4) showed a poor conversion of only 28%. Thus, in respect of the (comparative) short branched-chain carboxylic acid reactants, the process steps of the invention showed poor conversion (and hence, poor yield). This comparison suggests steric hindrance by substituent groups near the carboxylic acid group(s) inhibits the conversion process. The poor results obtained with neodecanoic acid and dodecenyl succinic anhydride make these materials unfeasible as starting materials for the present process.

In contrast, the same process when applied to the preferred longer-chain branched polycarboxylic reactants of the invention showed much higher iron conversions of 78% for Polymer 1 (branched-chain octadecenyl-succinic anhydride) and 93% for Polymer 2 (branched-chain hexadecenyl-succinic anhydride). Similarly, the iron conversion of even the less preferred branched polycarboxylic reactant of the invention (Polymer 3; polyisobutenyl-succinic anhydride; 49% iron conversion by ICP) indicates improved conversion over neodecanoic acid (20%) and dodecenyl-succinic anhydride (28%), despite the presence of a greater number of substituent side branches.

Example 3

Preparation of Additive Concentrates Comprising the Polymers

To compare the relative solubilities of the above polymer examples, a series of concentrates were prepared by blending each respective polymer in aromatic solvent (Solvesso™ 150—available commercially from the ExxonMobil Chemical group of companies) to a level of 1% polymer by weight (0.5% by weight in the cases of Polymers 6 and 8).

The concentrates were prepared using a series of 100 ml volumetric flasks, into which were weighed the requisite amount of each polymer. The majority of Solvesso 150 was added, each flask shaken, and then made up to the mark with the remaining solvent. The concentrate samples were then transferred to sealed glass containers.

These tests showed Polymers 6 and 7 to be poorly soluble in concentrate form, even at these relatively low concentration levels. When warmed to 60 degrees Centigrade and then allowed to cool overnight, the Polymer 6 and Polymer 7 concentrates both precipitated material from solution, demonstrating the inability of polymers derived from straight-chain, saturated monocarboxylate ligands to provide the physical properties sought by this invention.

Example 4

Example Preparations of the Iron-Containing Polymer from Fe (III) Nitrate

The following two preparations illustrate the process of the invention, employing Fe (III) nitrate and either an aqueous solution of weak base, or weak base added in solid form.

Example 4A

Aqueous Base

An aqueous solution of $NaHCO_3$ (84 g (1.0 mol) of $NaHCO_3$ in 150 ml of $H_2O$) was added drop-wise to an aqueous solution of $FeNO_3$ (125 g (0.31 mol) of $FeNO_3$ in 50 ml of $H_2O$) in a suitable glass beaker, with continuous stirring over the course of the addition. The highly exothermic reaction resulted in an effervescing orange solution, which gave up an insoluble brown precipitate on completion of the weak base addition. The precipitate was then washed with water (4×500 ml washes) through a size 5 filter paper in a large Buchner funnel, to leave a dark brown paste.

This intermediate product was transferred to a round-bottomed flask to which was added toluene (500 ml), the octadecenyl-succinic anhydride used in example 1 (27.15 g, 0.0775 mol) and triethyl amine (28.6 ml, 0.155 mol). A Dean-and-Stark apparatus was attached, and the reaction mixture refluxed for approximately five (5) hours until all the resulting water had been removed. The product of reaction, now dissolved in the toluene, was filtered through a size 4 filter paper and then through a size 5 paper in a Buchner funnel, and the solvent removed in vacuo to yield a dark brown solid. This material is designated Polymer 10.

As in Example 1, the conversion of the resulting carboxylic acid groups into bridging (μ-carboxylato) groups, as promoted by the tertiary nitrogenous base, can be monitored by Fourier Transform infra-red spectroscopy (FT-IR) to follow the progress of the reaction. The acid group absorbance peak (at 1705 cm$^{-1}$) transforms into the (μ-carboxylato) peak at an absorbance of approximately 1559 cm$^{-1}$. At the same time, the Fe—O—Fe peak at 721 cm$^{-1}$ shifts to approximately 704 cm$^{-1}$ as the Fe—O backbone becomes co-ordinated with the dicarboxylate species.

Example 4B

Solid Base

To an aqueous solution of $FeNO_3$ (125 g (0.31 mol) of $FeNO_3.9H_2O$ in 250 ml of $H_2O$) was added $(NH_4)_2CO_3$ (24 g, 0.25 mol) in solid form, in stepwise 5 g additions, with continuous stirring over the course of the addition. The base addition resulted in an effervescing orange solution which on complete addition gave up an insoluble brown precipitate.

The precipitate was then washed with water (3×3000 ml) on a centrifuge. The resulting dark brown paste was transferred to a 2 liter round bottom flask to which was added toluene (500 ml), the octadecenyl-succinic anhydride used in Example 1 above (27.15 g, 0.0775 mol) and triethyl amine (28.6 ml, 0.155 mol). A Dean-and-Stark apparatus was attached, and the reaction mixture refluxed for approximately 10 hrs until all the water was removed. The product, now dissolved in toluene, was filtered successively through size 4 and size 5 filter papers in a Buchner funnel and the solvent thereafter removed in vacuo to yield a dark brown solid, yield 43.69 g.

This material is designated Polymer 11.

Polymer 11 was made up into a 23% m/m concentrate in Isopar L (146.3 g) and then filtered using a size GF/A filter and then a GF/F filter in a Buchner funnel. As a final step the concentrate was passed through a GF/F filter attached to a suitable syringe. The resulting filtered concentrate had an iron content by ICP=7.99%.

B. Working Examples

Example 5

Demonstration of the Polymer's Improved Ability to Remain Distributed Within the Bulk Fuel Over Time (Stability)

A series of seven test fuel samples comprising a common Class I petroleum-derived diesel fuel having the characteristics stated below were prepared by respective treatment with one of Polymers 1 to 5 inclusive, 8 and 9. Polymers 6 and 7 were excluded from the test as impractical, in view of their previously-determined poor solubility in concentrate form.

Each respective polymer was added, in concentrate form, to a different sample of fuel in such amounts as to provide a level of iron within that fuel sample of either 10 or 25 ppm (parts per million by weight, per weight of fuel). In this way the relative stability of the different polymers could be compared at constant fuel iron content. In industrial applications, regeneration additives are typically used at a prescribed fuel iron content. The level of 10 ppm iron represents a high but viable treat rate, whilst the level of 25 ppm iron represents an over-treat situation for trap regeneration, such as when too much additive is inadvertently added through accident or poor operating controls.

A second series of fuel samples were prepared, identical to the first series except for the additional presence in all samples of 200 ppm (weight/weight) of a commercial lubricity additive composed of an ethoxylated fatty acid dimer. These tests were run to investigate the destabilising effect of the latter additive type on the iron polymer of the invention.

The two series of nine treated fuel samples were heated to 80 degrees Centigrade under static storage conditions, and observed. This raised temperature reflects the temperature of warmed fuel in a diesel vehicle fuel tank during use, the recycling of (excess) fuel warmed from contact with the fuel injection system causing the bulk fuel temperature in the tank to rise.

The results are shown in Table 1, below. In each case the time recorded was that period during which no precipitation/sediment, phase separation or haze was observed, indicating loss of stability of the respective polymer in that example. When a sample reached 32 days stability, the test was discontinued further.

| Characteristic | Unit | |
|---|---|---|
| Fuel distillation parameters | | |
| IBP | ° C. | 175 |
| 10% | ° C. | 206.1 |
| 50% | ° C. | 235.2 |
| 95% | ° C. | 279.1 |
| FBP | ° C. | 291.8 |

At 10 ppm fuel iron content, the polymers of the invention provided the best combination of (i) high stability and (ii) low destabilisation in the presence of lubricity additive. Of these examples, Polymers 1 and 2 showed the best resistance to destabilisation. Polymer 3 showed the best stability of all in otherwise untreated fuel, but also demonstrated proportionally-more destabilisation in the presence of the lubricity additive.

Of the comparative examples at 10 ppm fuel iron content, only Polymer 8 (neodecanoate) demonstrated high stability in the absence of lubricity additive. However, the deterioration seen with this material in the presence of lubricity additive was greater than for any example of the invention. Furthermore, as previously demonstrated in example 2, the yield of Polymer 8 was extremely poor, rendering the Polymer unviable for practical use.

At 25 ppmm fuel iron content, the polymers of the invention again provided the best combination of (i) high stability and (ii) low destabilisation in the presence of lubricity additive.

The polymers of the invention again showed outstanding stability in the presence of lubricity additive, in contrast to all but one of the comparative additives. Whilst polymer 5

| Fuel sample | Polymer used in test | Polymer treat rate (ppm, w/w) | Stability of fuel sample (days) | | Extent of destabilisation |
|---|---|---|---|---|---|
| | | | Without lubricity additive | With lubricity additive | |
| 1A | 1 | 10 | 20 | 18 | 10% |
| 2A | 2 | 10 | 18 | 18 | 0% |
| 3A | 3 | 10 | 32 | 15 | 53% |
| 4A | 4 | 10 | 9 | 1 | 89% |
| 5A | 5 | 10 | 9 | 13 | −44% |
| 6A | 8 | 10 | 32 | 13 | 59% |
| 7A | 9 | 10 | 13 | 1 | 92% |
| 1B | 1 | 25 | 18 | 32 | −44% |
| 2B | 2 | 25 | 32 | 32 | 0% |
| 3B | 3 | 25 | 32 | 32 | 0% |
| 4B | 4 | 25 | 20 | 1 | 95% |
| 5B | 5 | 25 | 6 | 6 | 0% |
| 6B | 8 | 25 | 32 | 10 | 69% |
| 7B | 9 | 25 | 20 | 1 | 95% |

Footnote:
fuel samples 4A to 7A, and 4B to 7B, are comparative examples.

Example 5 Fuel Characteristics

| Characteristic | Unit | |
|---|---|---|
| Density | Kg/m³ | 811.1 |
| KV, 40° C. | cSt | 1.942 |
| KV, 20° C. | cSt | 2.843 |
| Cetane number | | 58.1 |
| Sulphur | % (w/w) | <0.0005 | showed no further deterioration in the presence of lubricity additive, its baseline stability was poor at only 6 days.

Example 6

Demonstration of the Viscosity Advantage Provided by the Polymer

The preparation of high concentration solutions of the polymer, such as are ideal for use in on board dosing systems, demonstrates the concentrate viscosity advantage provided by the present invention.

Three concentrates were prepared by conventional laboratory blending. In each case, the solvent used was 'Isopar L' which is a commercially-available aliphatic solvent.

Into the first concentrate was blended the conventional iron neodecanoate used in Example 7. This iron salt was added in an amount sufficient to provide the resulting concentrate with an iron content of 6% (by weight, per weight of solvent). The kinematic viscosity (KV) of the resulting concentrate at −30 degrees Centigrade was 1738 centiStokes (cSt). This temperature reflects a low ambient temperature, as might be encountered in Northern European winters. Such a high viscosity creates operational difficulties for concentrates which must be doped in finely-metered aliquots in an on-board dosing system.

The second and third concentrates were prepared using Polymer 10 of Example 4A, to iron contents of 7.3 and 8.5% respectively. The KV values of the resulting concentrates, even at the lower temperature of −40 degrees Centigrade, were only 32.6 and 79.3 respectively. Compared to the conventional iron salt, the low temperature viscosities of the concentrates of the invention were greatly improved, even in the face of higher iron contents and lower temperatures. Such concentrates thus offer a more concentrated, usable form of iron highly suitable for trap regeneration in diesel engine devices dependent upon on board dosing systems.

Example 7

Demonstration of the Polymer's Lower Tendency to Cause Fuel Injector Deposits

The diesel fuel injector fouling tendency of the polymer was investigated using the known test described in detail in the paper entitled "Injector Deposit Test For Modern Diesel Engines" by O. Graupner and T. Klaua of Siemens VDO Automotive AG, R. Caprotti and A. Breakspear of Infineum UK, and A. Schik and C. Rouff of APL Automobil Prueftechnik GmbH. This paper was presented at, and thereafter published in print in the proceedings of, the 5th International Colloquium of the Technische Akademie Esslingen, held on 12-13 Jan. 2005.

The published proceedings, edited by Wilfried J Bartz, are available under the international reference ISBN 3-924813-59-0. This published description of this test method is herein incorporated by reference.

In summary, this test (like other injector fouling tests) investigates the tendency of deposits to accumulate on the critical surfaces of the injector parts which open to permit fuel into the combustion chamber of the diesel engine. Such deposits can obstruct and or alter the spray pattern of the fuel, so adversely affecting the air-fuel mixing and combustion processes, and hence reducing power output from the engine.

This particular test is especially applicable to modern high pressure injection systems and records the change in engine torque (if any) produced by the engine caused by running the fuel of interest through the test protocol. A loss of torque over the course of the test relates to a deleterious build-up of injector deposits during the test. In comparative tests, the relative effects on torque can be used to deduce the relative tendencies of different substances to cause injector fouling.

Polymer 10 and an existing iron regeneration additive (an iron salt of neodecanoic acid) were compared in the above test using a common reference fuel characterised in the table below. The modern reference fuel per se was of good quality and showed little tendency to cause injector fouling—over the course of the twenty hour test, the drop in torque was 0.5%, i.e. only one half of one percent.

Example 7 Fuel Characteristics

| Characteristic | Unit | |
|---|---|---|
| Density | Kg/m$^3$ | 844.9 |
| KV, 40° C. | cSt | 2.519 |
| KV, 20° C. | cSt | 3.935 |
| Cetane number | | 55.4 |
| Sulphur | % (w/w) | 0.0005 |
| Fuel distillation parameters | | |
| IBP | ° C. | 179.9 |
| 10% | ° C. | 211.6 |
| 50% | ° C. | 252.3 |
| 95% | ° C. | 337.1 |
| FBP | ° C. | 353.6 |

The use of the iron neodecanoate salt in an amount providing the reference fuel with an iron content of 6 ppm (weight/weight) caused a drop in torque of 15.3% over the course of a twenty hour test. Given the excellent fuel baseline result, this greatly-increased injector fouling can be clearly attributed to the addition of the iron salt. Thus, whilst known to be effective as a regeneration additive, the iron salt demonstrated the secondary problem of causing or promoting fouling tendency in the modern diesel injector.

In contrast, a further test using Polymer 10 of the invention in place of the iron salt, to the same fuel iron content of 6 ppm weight/weight, resulted in a drop in torque of only 3.5% over the course of the twenty hour test. Thus, the polymer of the invention showed less than one quarter of the adverse impact on torque, when compared to the iron salt, measured at the same fuel iron concentration. This clearly points to the polymer of the invention having a greatly-reduced tendency to cause or promote injector fouling.

The skilled person will appreciate that other injector fouling tests known in the art could also suitably be used to demonstrate injector fouling tendency. Thus, for example, conventional tests based on the Peugeot XUD-9 diesel engine, and which measure the deposit build-up on the injector directly via an assessment of air-flow loss through the injectors after a period of engine operation on test fuel, can also be used to demonstrate the benefits of the present invention.

Example 8

Demonstration of the Polymer's Ability to Regenerate a Particulate Trap

The polymer concentrate prepared in Example 6 (to a concentrate iron level of 7.3% weight) was investigated for its ability to promote the regeneration of a diesel exhaust particulate trap in an engine test environment.

In summary, a Volkswagen 1.9 liter TDi (turbocharged diesel) engine was used carrying an exhaust system fitted with a particulate trap. The engine was experimentally modified by fitting an engine head running a common rail fuel injection system, to represent future engine design and to permit post-injection of fuel for comparative test purposes. This engine was used to compare the regeneration efficiency of the 7.3% wt polymer concentrate against the known regeneration additive iron neodecanoate. In each of a series of comparable, controlled experiments, the engine was run firstly without regeneration additive to load the trap to a pre-determined level of soot, and thereafter run with the selected additive to determine that additive's ability to promote the combustion of that collected quantity of soot in the trap. Between each test, the trap was cleaned of soot, and the fuel line pre-flushed with the next test fuel sample, to ensure no carry-over effects between experiments. The results consistently showed the polymer example of the invention to be equivalent in function to iron neodecanoate for regenerating the trap.

In detail, the test engine was fitted with an exhaust system particulate trap comprising a silicon carbide filter medium. The first (soot loading) phase of each experimental run was achieved by running the engine on modern, low sulphur diesel fuel (having a sulphur content of less than 10 ppm by weight, per weight of fuel) at operating conditions of 2500 rpm (revolutions per minute) and 3 bar BMEP, until the target accumulated particulate density (a mass of 8 g particulate per liter of trap volume) had been collected in the trap (as determined by weight gain of the trap over the soot loading phase).

Regeneration tests were thereafter carried out under two alternative sets of conditions, each of which generated a controllable exhaust gas temperature of 450° C. upstream of the trap, i.e. a temperature well below the spontaneous ignition temperature of collected soot in a catalyst-free environment. The first set of conditions involved the engine being run at 2500 rpm and sufficiently high load to raise the exhaust gas temperature (as measured upstream of the particulate trap) to the required 450° C. The second, alternate set of conditions involved the post-injection of fuel direct into the combustion chamber at a point on the engine cycle at which combustion cannot occur, leading to an increase in the exhaust gas temperature as a consequence of local combustion. This post-injection was controlled to the level resulting in an exhaust gas temperature of 450° C. upstream of the trap.

Regeneration tests of 10 minutes duration were carried out under each set of conditions using fuel doped either with iron neodecanoate, or with the 7.3% wt polymer concentrate of the invention, in each case the respective additive being doped to the level contributing either 3 ppm weight or 10 ppm weight of iron, per weight of fuel. In this way, the performance of the additives could be compared at two equal iron concentrations. In each case, the resulting regeneration of soot manifested itself in a weight loss from the soot-loaded trap, which was thereafter presented as the percentage of loaded soot which had been burned off by the effect of the respective additive at 450° C.

The results of the tests are shown in the Table below. The iron neodecanoate tests were run in duplicates; in two comparisons (no.s 2 and 4, at 10 ppm iron), it can be seen that the result for the polymer lies within the spread of the two neodecanoate tests, whilst in the other two comparisons (no.s 1 and 3, at 3 ppm iron), the result for the polymer lies above both neodecanoate test results.

Regeneration Test Results

| Comparison No. | Test (iron concentration) | Iron neodecanoate | Polymer of the invention |
| --- | --- | --- | --- |
| 1 | Post injection (3 ppm iron) | 7.6 and 12.2% | 13.4% |
| 2 | Post injection (10 ppm iron) | 21.8 and 36.6% | 28.0% |
| 3 | Load increase (3 ppm iron) | 6.4 and 7.3% | 10.1% |
| 4 | Load increase (10 ppm iron) | 18.0 and 24.4% | 21.2% |

The polymer of the invention thus compares favourably with an existing iron-based additive for regeneration performance, whilst providing a superior balance of physical properties (namely better fuel stability, reduced injector fouling tendency and lower viscosity in concentrate form) permitting its more effective use as an additive for both bulk fuel and on board applications.

The invention claimed is:

1. A process for the preparation of an iron-containing polymer suitable for use as an additive in fuel, comprising the following steps:
   i) obtaining or preparing an aqueous solution of either one or more iron (II) salts, iron (III) salts, or a mixture of iron (II) salts and iron (III) salts;
   i)(a) permitting or causing the oxidation of iron (II) ions to iron (III) ions, by exposure to air and/or other oxidizing agent;
   ii) adding thereto a weak base, in a stepwise manner, whilst continuously stirring the reaction medium over the course of base addition;
   iii) wherein the total amount of base added over the course of step ii) is such as to provide a molar ratio of iron to total base added in the range of 1:2.5 to 1:3.5, and to obtain a wet precipitate;
   iv) reacting the wet precipitate from step iii) under reflux, in an organic solvent, with a tertiary nitrogenous base and one or more polycarboxylic acids and/or derivatives thereof, the water evolved over the course of the reaction being removed;
   v) wherein at least one polycarboxylic acid and/or derivative employed in step iv) comprises a branched-chain hydrocarbyl substituent containing at least 14 carbon atoms, and wherein the total amount of all polycarboxylic acids and/or derivatives thereof employed in step iv) is such as to provide the reaction mixture with a molar ratio of iron to total carboxylic groups including any derivatives thereof in the range of 1:1 and 3:1; and
   vi) removing the resulting solid polymer material.

2. The process of claim 1 wherein step iv) employs the tertiary nitrogenous base and one or more polycarboxylic acids and/or derivatives in amounts such that the molar ratio of nitrogenous base to total carboxylic groups including any derivatives thereof is in the range of 1:1 to 2:1.

3. The process of claim 1 wherein the water evolved in step iv) is removed continuously over the course of the reaction in step iv).

4. The process of claim 1 wherein the weak base added in step ii) is one or more carbonates or hydrogen carbonates of sodium, potassium, magnesium, calcium or a quaternary ammonium cation.

5. The process of claim 1 wherein only iron nitrate or an iron halide is used in step i).

6. The process of claim 1 wherein the total amount of base added over the course of step ii) is such as to provide a molar ratio of iron to total base added in step ii) of 1:3.

7. The process of claim 1 wherein the tertiary nitrogenous base is triethyl amine.

8. The process of claim 1 wherein all of the one or more polycarboxylic acids and/or derivatives thereof employed in step iv) comprise at least one branched-chain hydrocarbyl substituent containing at least 14 carbon atoms.

9. The process of claim 1 wherein the one or more polycarboxylic acids and/or derivatives thereof employed in step iv) is a mixture of dicarboxylic acids, or dicarboxylic anhydrides, or a mixture of both.

10. The process of claim 1 wherein step iv) employs one or more dicarboxylic acid anhydride derivatives of the structure (I):

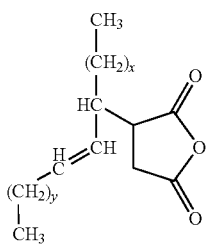

wherein x and y are independent integers, the sum of which is 9 to 29.

11. The process of claim 10, wherein the sum of x and y in formula (I) is 11 or 13.

12. The process of claim 1 wherein the wet brown precipitate obtained at the end of steps ii) and iii) is washed with water before being reacted in stage iv).

13. The process of claim 1 wherein the solid polymer material is removed by filtration in step vi).

14. The process of claim 1 wherein the weak base is sodium hydrogen carbonate, an iron (III) salt is present and is hydrated iron (III) nitrate, the tertiary nitrogenous base is triethyl amine and the one or more polycarboxylic acids and/or derivatives thereof is a mixture of branched-chain isomers of octadecenyl succinic anhydride.

15. The iron-containing polymer obtained by the process of claim 1.

16. The process of claim 1, wherein said aqueous solution of step i) is an aqueous solution of one or more iron (III) salts.

17. An additive concentrate comprising a polymer obtained by the process of claim 1, in an organic solvent compatible therewith.

18. An additive concentrate of claim 17 further containing a hydrocarbyl alcohol.

19. An iron-containing polymer consisting of a polymeric backbone from which a plurality of co-ordinating ligands depend, the backbone consisting of alternating iron and oxygen atoms in a chain-like structure, and the co-ordinating ligands being polycarboxylate ligands, wherein the polycarboxylate ligands comprise ligands having branched hydrocarbyl substituent groups containing at least 14 carbon atoms.

20. The polymer of claim 19, wherein the polycarboxylate ligands are a mixture of dicarboxylate ligands consisting of dicarboxylate ligands having one branched hydrocarbyl substituent group containing at least 14 carbon atoms.

21. The iron-containing polymer of claim 19, wherein the polycarboxylate ligands are a mixture of succinate ligands derived from the one or more dicarboxylic acid derivatives of the structure (I):

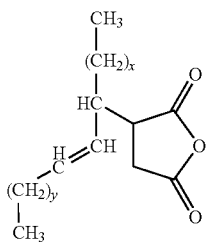

wherein x and y are independent integers the sum of which is 9 to 29.

22. The iron-containing polymer of claim 21, wherein the polycarboxylate anions are derived from structure (I) wherein the sum of x and y is 11 or 13.

23. The polymer of claim 22, wherein each dicarboxylate ligand is derived from a branched-chain octadecenyl succinic anhydride precursor.

24. An additive concentrate comprising the polymer of claim 19, in an organic solvent compatible therewith.

25. A method of regenerating a diesel exhaust particulate trap of a diesel engine-powered device fitted with on board storage for an additive and a device for dosing of fuel therewith, comprising the use of the additive concentrate of claim 24 as the stored additive, and the dosing of same into the fuel in amounts effective to promote regeneration of the particulate trap in operation of the engine.

26. A method of reducing particulate emissions from the diesel engine system of a diesel engine-powered device, comprising:
 a. the addition to the diesel engine system of a diesel exhaust particulate trap;
 b. the fitting to the device of on board means for the storage of additive and the dosing of fuel therewith; and
 c. the use therein of the additive concentrate of claim 24,
 wherein the on board means dose the additive concentrate into the fuel in an amount effective to promote regeneration of the particulate trap in operation of the engine system.

27. An additive concentrate of claim 24 further containing a hydrocarbyl alcohol.

28. A fuel composition comprising:
 a. fuel being derived either from a petroleum source or from oils or fats of animals and/or plants, or being a mixture of both; and
 b. the polymer of claim 19, wherein the polymer is present in the fuel composition in an amount effective to improve the combustion of carbonaceous material originating from the fuel a. when the fuel composition is used in a combusting device.

29. The fuel composition of claim 28, wherein the fuel is either a diesel fuel or a fuel for use in domestic or industrial power generation or heating.

30. The composition of claim 28, which further comprises a lubricity additive.

31. The composition of claim 30, wherein the lubricity additive is the mono- or bis-glycol or polyglycol ester of a polycarboxylic acid.

32. A diesel fuel composition for use in a diesel engine system comprising an exhaust particulate trap, comprising:
 a. diesel fuel, being derived either from a petroleum source, or from oils or fats of animals and/or plants; or being a mixture of both; and
 b. the polymer of claim 19,
 wherein the polymer is present in the fuel composition in an amount effective to promote regeneration of the particulate trap in operation of the engine system.

33. A method of regenerating a diesel exhaust particulate trap fitted to a diesel engine-powered device, comprising the operation of said engine on the fuel composition of claim 32.

34. The iron-containing polymer of claim 19, wherein the backbone consisting of alternating iron and oxygen atoms in a chain-like structure bears hydroxyl groups as pendant or bridging groups and wherein the co-ordinating ligands include water molecules.

* * * * *